UNITED STATES PATENT OFFICE.

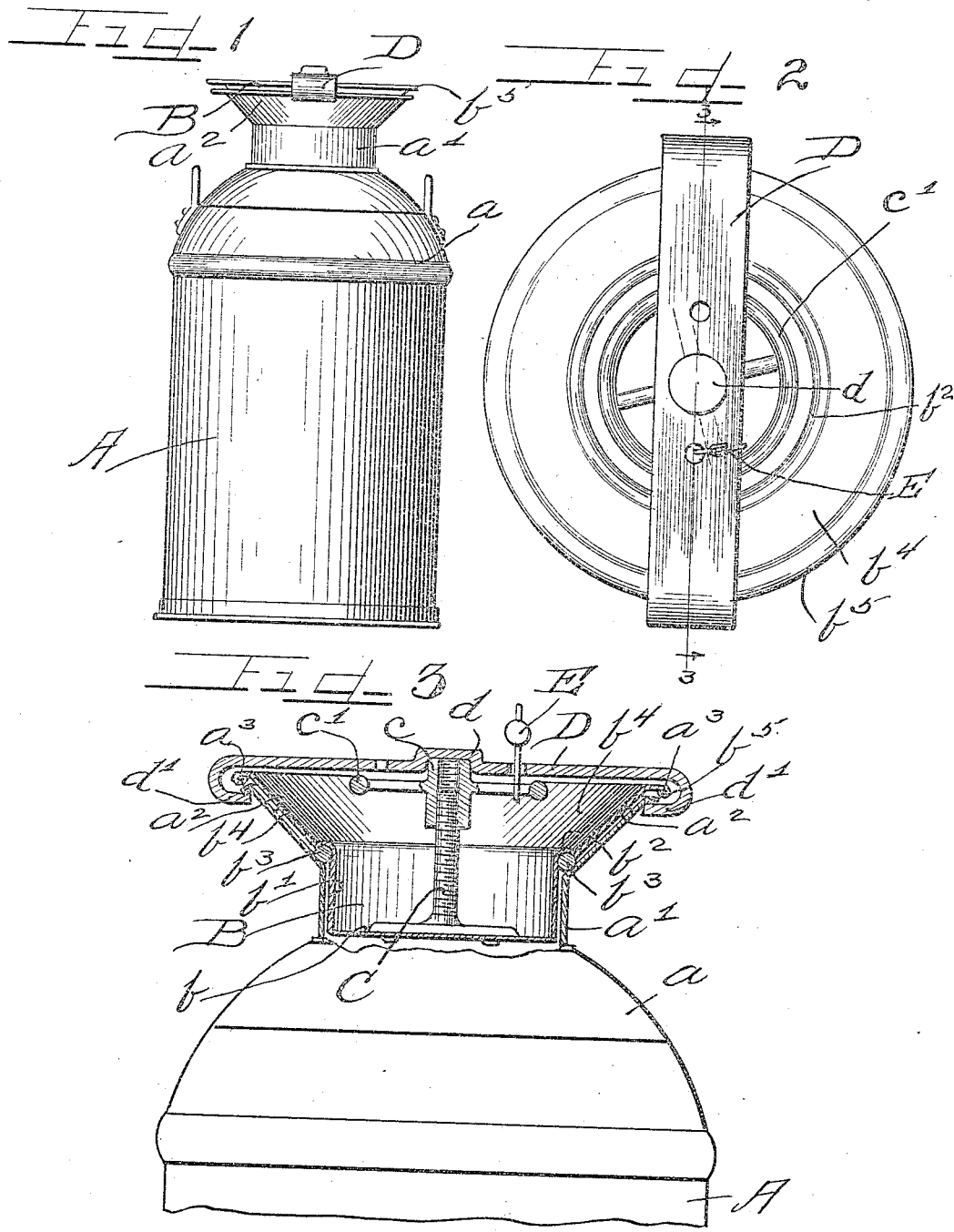

LEE STURGES, OF CHICAGO, ILLINOIS.

HERMETICALLY-SEALING STOPPER FOR CANS.

952,717.

Specification of Letters Patent. Patented Mar. 22, 1910.

Application filed February 10, 1909. Serial No. 477,170.

*To all whom it may concern:*

Be it known that I, LEE STURGES, a citizen of the United States, and a resident of the city of Chicago, in the county of Cook and State of Illinois, have invented certain new and useful Improvements in Hermetically-Sealing Stoppers for Cans; and I do hereby declare that the following is a full, clear, and exact description of the same, reference being had to the accompanying drawings, and to the letters of reference marked thereon, which form a part of this specification.

The wide diffusion of knowledge of sanitary laws and the present general knowledge of the danger arising from the use of milk and other food products shipped or handled in packages so constructed as to permit bacterial or other contamination and the fact that milk is frequently shipped and sometimes kept for a considerable period of time in unsanitary places and sometimes is thereby infected bacterially to an extent as to render the same extremely dangerous for use, has caused the adoption and quite general enforcement of very stringent milk inspection laws and ordinances. The consumers are, of course, uninformed of the sanitary conditions surrounding the milk at the dairy, in transit, and at the delivery stations but are well aware that even pasteurized milk may be dangerously infected after pasteurization and before consumption.

The object of this invention is to provide a construction whereby milk and other food products may be kept in a perfect sanitary condition after sterilization and until delivery by means of a hermetically sealing stopper adapted to be sealed in place.

It is also an object of the invention to afford a stopper for milk cans adapted to exclude dirt and all contaminating or injurious substances and materials and to enable the purchaser to assure himself that the milk has not been injuriously exposed to contamination or the can unsealed in any manner between shipment from the dairy and receipt at the distributing depot.

It is also an object of the invention to afford a stopper for cans adapted to be firmly pressed into sealing position and adapted to be locked or sealed in place to an extent to permit unauthorized interference to be instantly detected.

It is further an object of the invention to provide a can stopper of the class described having a gasket thereon adapted to seal the stopper in the can top or neck.

It is also an object of the invention to greatly strengthen and reinforce the can top or cover and to afford in connection therewith an adjustable locking means whereby the cover may be firmly clamped in place to seal the can.

Finally, it is an object of the invention to afford in a device of the class described a locking bar adapted to be engaged on the can top and to afford a medium against which pressure is applied in jamming the stopper into and firmly holding the same seated in the can neck.

The invention consists in the matters hereinafter described and more fully pointed out and defined in the appended claims.

In the drawings: Figure 1 is a side elevation of a milk can provided with a stopper embodying my invention. Fig. 2 is a top plan view thereof. Fig. 3 is a section on line 3—3 of Fig. 2.

As shown in the drawings: the milk can A, is shown of the usual or familiar type having a dome shaped can breast $a$, secured on the top thereof and firmly and hermetically united with the can neck $a'$, and flaring outwardly from, and connected with the top of the can neck is the can mouth $a^2$, in the top of which is rolled a wire $a^3$, to afford an outwardly and downwardly directed peripheral bead, as usual, for the purpose of reinforcing the can mouth. Said can with the neck and flaring or bell mouth thereof is constructed as usual, and of course, may be of any required dimensions.

Seated in the can top to close the can mouth is the stopper B, usually constructed of pressed metal and having an integral bottom $b$, and upwardly extending side walls $b'$, peripherally connected therewith which extend to near the top of the can neck and slightly above. The angle afforded between the can neck and outwardly flaring mouth is provided with a peripheral groove or recess $b^2$, adapted to receive a rubber or other suitable gasket $b^3$, usually constructed in the form of a more or less resilient ring of round rubber, which engages firmly in said groove, as shown in Fig. 3, and when the top is inserted in place presses firmly on the can mouth adjacent the neck. From said gasket $b^3$, the can top or cover flares outwardly, as shown at $b^4$, as is usual with can tops and extends laterally and peripherally over the top of the can mouth and at its periphery may be provided with a strengthening bead $b^5$, as is usual or may be otherwise reinforced to protect the same from injury.

Riveted or otherwise permanently and rigidly secured in the bottom of the can top is an upwardly extended threaded shaft C, having a relatively large foot piece integral therewith through which said rivets or other fastening means connecting with the top extends. Threaded on the shaft C, is the hub $c$, of a hand wheel $c'$, the ends of the hub $c$, of which extend outwardly for a considerable distance from the plane of the wheel. The upper or outer end of the hub is adapted to engage in a complemental seat in the locking bar D, which may be constructed of cast or malleable iron, or of steel, and is hooked downwardly and inwardly at its ends $d'$, to engage beneath the peripheral bead $a^3$, on the can top. Said locking bar D, is provided with apertures therein, as shown in Figs. 2 and 3, through which may be extended a wire lead seal E, which engages one of the arms or spokes of the hand wheel to the locking bar D, and thereby prevents relative movement thereof without destroying the seal.

The operation is as follows: Having filled the can with pasteurized or other milk or material which it is desired to protect from contamination or injury, the top or cover is pressed therein with the gasket in place, and of course, the hand wheel is turned down on the shaft C, sufficiently to permit the locking bar to be conveniently and easily secured in place. The hand wheel is then rotated to thread the wheel outwardly on the shaft C, thus bringing the upper end of the hub, into the recess or bearing, in the locking bar and the hand wheel is rotated or turned up on the shaft sufficiently to exert a degree of pressure on said locking bar sufficient to prevent removal of the top without releasing the hand wheel. The wire of the seal E, is next inserted through one of the apertures in the locking bar, carried around one of the spokes or arms of the locking wheel and sealed with lead or other suitable material to permit interference or tampering with said can to be instantly detected by an inspector or receiver of the goods.

When it is desired to empty the cans, of course the seal is broken and the hand wheel reversed sufficiently to allow the bar to slip from the top of the can. The stopper is then removed from the can as usual.

Of course, while I have mentioned rubber as a desirable gasket it is obvious that other materials than rubber may be employed, if desired, the only object being to protect the contents of the can from contamination, and of course, owing to the simple construction of the gasket, should the same ever become worn, it can be easily replaced by stripping the rubber gasket from the can top and replacing a new or better one.

Obviously, the construction adds but very slightly to the weight of the can and insures better sanitary conditions and less loss of material in transit than has heretofore been the case. Of course, details of the construction may be varied. I therefore do not purpose limiting this application for patent otherwise than necessitated by the prior art.

I claim as my invention:

1. A cover for milk cans embracing in connection with the cover a gasket for engaging between the stopper and can and a locking bar hooked downwardly and inwardly at both ends engaging the can acting to hold the cover inwardly.

2. A stopper for milk cans embracing in connection with the stopper a sanitary gasket adapted to engage between the stopper and can and a locking bar hooked downwardly and inwardly at its extremities to engage beneath a peripheral bead on the can top and acting to hold the stopper in place.

3. In a device of the class described a stopper adapted to fit in a can top, a locking bar provided with apertures on either side of the center through which may be extended a wire seal, said bars engaging over the can top and stopper, and mechanism secured in the can stopper and adjustably engaging the locking bar to hold the stopper in place, and a gasket fitted between the can top and stopper.

4. A milk can stopper of pressed metal comprising a bottom, upwardly directed walls corresponding with the can neck, an outwardly flaring top to the stopper, a peripheral recess in the stopper adapted to receive a gasket in position to bear in the can neck, and a locking bar hooked downwardly and inwardly at both ends adapted to engage a peripheral bead on the can top.

5. In a device of the class described a milk can stopper of pressed metal comprising a bottom, upwardly directed walls corresponding with the can neck, an outwardly flaring top to the stopper, a peripheral recess in the stopper adapted to receive a gasket in position to bear in the can neck, an upwardly extending threaded shaft rigidly secured to said bottom, a hand wheel threaded on said shaft, a locking bar engaging the can top and adapted to be engaged by the hand wheel and provided with apertures, and a sealing device adapted to engage one of the spokes of the wheel to said locking bar.

6. A milk can stopper embracing in connection with the stopper a threaded shaft extending axially upward in the stopper, a hand wheel threaded on the shaft, a locking bar engaging over the top of the stopper and removably engaging beneath the top of the can and adapted to be engaged centrally by the hand wheel, and a sealing device engaging said bar to prevent release without detection.

7. A milk can stopper embracing in combination with the milk can top and a locking bar removably engaging over the stopper and beneath the rim on either side of the can mouth, of adjustable means within the can stopper adapted to releasably engage the locking bar to force the stopper inwardly and a removable gasket on the stopper adapted to engage in the can neck.

8. A milk can stopper embracing a central upwardly extended threaded rod therein, of a locking bar hooked downwardly and inwardly at its extremities adapted to engage the can top, a nut on the shaft or rod adapted to press on said locking bar to force the stopper inwardly, and a gasket extending around the stopper.

9. A locking bar for milk cans embracing a bar or strap of metal hooked downwardly and inwardly at each end to engage beneath the peripheral bead on a can top and having seal apertures arranged on each side of the center thereof, and mechanism engaged in a can stopper adapted to releasably engage said locking bar to hold the stopper from removal.

10. A locking bar for milk cans embracing a bar or strap of metal hooked at its ends to engage over and beneath the lip of the can and having seal apertures arranged on each side of the center thereof and a seat in said locking bar adapted to receive the hub of a hand wheel.

11. A stopper for milk cans embracing in connection with the stopper an external peripheral gasket, a bar or strap of metal hooked downwardly and inwardly at each end to engage beneath a peripheral bead on the can top and a central internally threaded shaft rigidly secured to the bottom of the stopper.

12. A milk can stopper of pressed metal comprising a bottom, upwardly directed walls corresponding with the can neck, an outwardly flaring top to the stopper adapted to receive a gasket in position to bear in the can neck, a peripheral bead on said can neck, a locking bar hooked downwardly and inwardly at both ends adapted to engage the flaring top of the can neck and having an aperture through which may be secured a seal.

13. In a device of the class described a milk can stopper comprising a bottom, upwardly directed walls corresponding with the can neck, an outwardly flaring top to the stopper to fit in the can mouth, an upwardly extending threaded shaft secured to said bottom, a hand wheel threaded on said shaft, a locking bar hooked at its ends to engage over and beneath the can lip and provided with apertures and having a central seat adapted to receive the hub of the hand wheel and a seal for engaging the wheel to the bar.

In testimony whereof I have hereunto subscribed my name in the presence of two subscribing witnesses.

LEE STURGES.

Witnesses:
H. E. HANNAH,
LAWRENCE REIBSTEIN.